Jan. 26, 1926. 1,570,887
W. B. GRAVES
PIPE CONNECTION
Filed Dec. 29, 1924
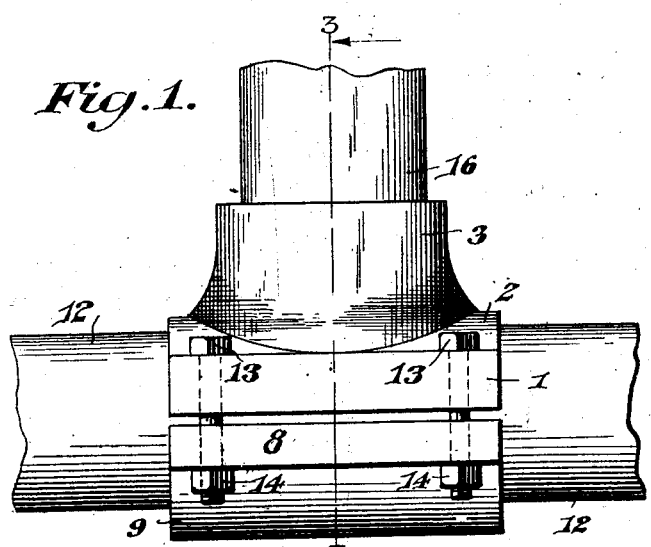
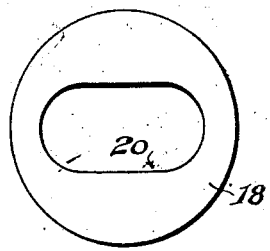
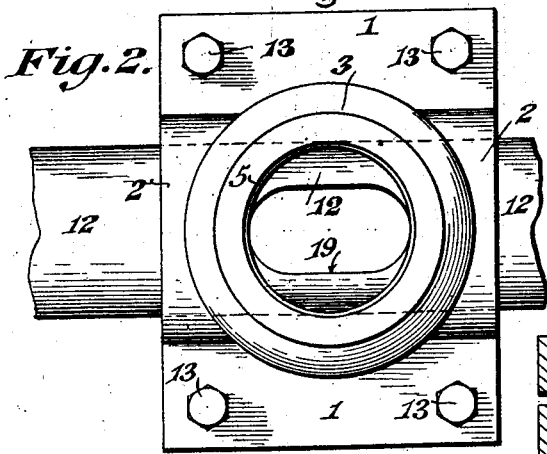
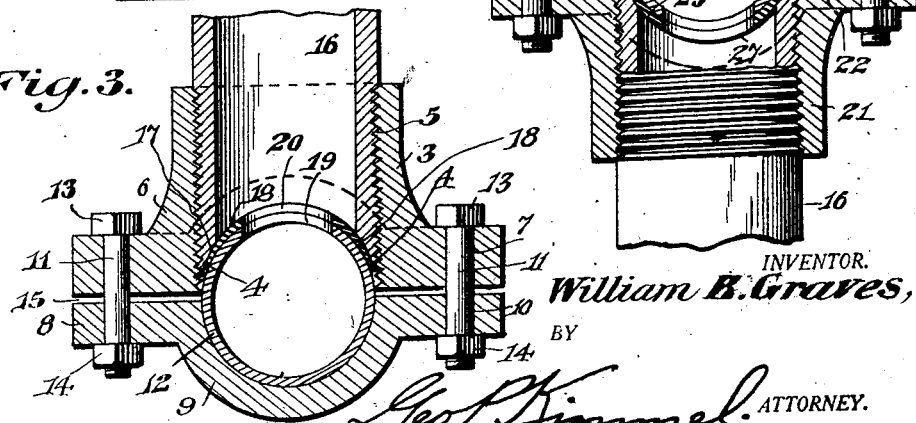
INVENTOR.
William B. Graves,
BY
Geo. P. Kimmel,
ATTORNEY.

Patented Jan. 26, 1926.

1,570,887

UNITED STATES PATENT OFFICE.

WILLIAM B. GRAVES, OF KINGMAN, ARIZONA.

PIPE CONNECTION.

Application filed December 29, 1924. Serial No. 758,718.

*To all whom it may concern:*

Be it known that I, WILLIAM B. GRAVES, a citizen of the United States, residing at Kingman, in the county of Mohave and State of Arizona, have invented certain new and useful Improvements in Pipe Connections, of which the following is a specification.

This invention relates to a pipe connection, more particularly to what may be termed an adjustable pipe T, and has for its object to provide, in a manner as hereinafter set forth, a connection of such class whereby it is possible to tap a pipe line and connect a take off pipe of equal size at any point on the pipe line without disconnecting or separating pipe sections employed for setting up the pipe line.

Further objects of the invention are to provide, in a manner as hereinafter set forth, a pipe connection for the purpose referred to, which is simple in its construction and arrangement, strong, durable, compact, thoroughly efficient and convenient in its use, readily installed, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a pipe connection in accordance with this invention.

Figure 2 is a top plan view thereof.

Figure 3 is a section on line 3—3, Figure 1.

Figure 4 is a top plan view of the packing element prior to the positioning thereof.

Figure 5 is a sectional elevation of a duplex pipe connection in accordance with this invention.

Referring to Figures 1 to 4 of the drawings, a pipe connection in accordance with this invention comprises an upper and a lower saddle which are arranged in opposed relation, and are oppositely disposed with respect to each other. Each of these saddles may be made of any material, such as metal, wood, fiber or any suitable material depending upon the circumstances when the connection is used. These saddles are secured together in opposed relation around the main pipe line and to one of the saddles is attached the branch conducting pipe which is adapted to communicate with the main pipe line when it is desired to tap the latter.

The upper saddle consists of a rectangular body portion 1, having the medial part thereof up-standing, as at 2 and semi-circular in contour. Formed integral with the medial part 2 of the body portion 1, is a vertically disposed sleeve 3 and which forms a continuation of the opening 4, provided centrally of the body portion 1. The wall of the opening 4, as well as the wall of the sleeve 3 is provided with screw threads, as indicated at 5. The sleeve 3 is of greater thickness at its lower portion, as indicated at 6, than at its upper portion whereby the outer diameter of the sleeve 3 at its point of joinder with the medial part 2 is greater than the outer diameter of the upper portion of the sleeve 3.

The body portion 1, in proximity to each corner thereof, is provided with an opening 7.

The lower saddle consists of a rectangular body portion 8, having the medial part 9 thereof offset and semi-circular in contour. The body portion 8 in proximity to each corner thereof is provided with an opening 10, and said opening 10 when the upper and lower saddles are mounted in superposed relation is arranged in alignment with respect to the openings 7.

The medial part 2, which is semi-circular in contour, extends lengthwise with respect to the body portion 1, and the medial part 9 which is also semi-circular in contour extends lengthwise of the body portion 8.

The openings 7 and 10 are provided for the passage of headed bolts 11 for the purpose of connecting the upper and lower saddles to the main pipe line 12. The heads of the bolts 11 are indicated at 13 and engage the upper face of the body portion 1. The bolts 11 depend below the body portion 8 and carry securing nuts 14 which abut against the lower face of said body portion 8. When the upper and lower saddles are connected to the main pipe line 12, they are slightly spaced from each other as at 15 to provide for adjustment.

The upper saddle is employed for connecting a branch or take-off pipe with the main line pipe 12. The inner end of the pipe 16 is of arcuate contour, whereby the edge of said end will be of greater width than the thickness of the body of the take-off pipe and further whereby said edge will be curved, as indicated at 17. The arcuate-shaped inner end of the pipe 16 conforms in contour to the curvature of the main pipe line 12 and as shown in Figures 3 and 5 the take-off pipe 16 is spaced from the main line pipe 12 by a packing disk or washer 18, which when the take-off pipe is in position, is semi-circular in cross section. The opening 4 in the body portion 1 of the upper saddle is of the same diameter throughout and of the same diameter as the inner diameter of the sleeve 3, and the diameter of the washer 18 is such that when interposed between the take-off pipe and main line pipe the outer edge thereof will be spaced outwardly with respect to the inner end of the opening 4. The washer 18 is formed of any suitable material and gradually decreases in thickness from its outer edge towards its center. The branch or take-off pipe 16 is peripherally threaded for engagement with the threads 5, whereby the pipe 16 is secured to the upper saddle.

When it is desired to tap the main pipe line 12 for the purpose of causing discharge therefrom through the branch pipe 16, the main pipe line 12, at its top, is formed with an opening, preferably of oval contour, as indicated at 19 and which is disposed lengthwise with respect to the main pipe line 12, as shown in Figure 2. The packing washer 18 is formed with an opening 20 which conforms in contour to the opening 19, and when the washer 18 is set up in interposed position between the branch pipe 16 and the main pipe line 12, the wall of the opening 20 registers with the wall of the opening 19, as shown in Figure 3.

In the modified construction shown in Figure 5, the upper and lower saddles which are indicated at 21, 22, respectively are of like construction in the same manner as the form of upper saddle shown in Figure 1.

A packing washer is employed in connection with each saddle and which is indicated at 23. The washers 23 are oppositely disposed and each is constructed in the same manner as the washer 18. When the form of connection shown in Figure 5 is employed, the main pipe line which is indicated at 24, is formed with a pair of diametrically disposed openings 25, preferably oval in contour and which extend lengthwise of the main pipe line 24. The upper and lower saddles of the form of connection shown in Figure 5 are secured together in superposed relation in the same manner as the saddles shown in Figure 1, and the connecting bolts employed in the form shown in Figure 5 are indicated at 26.

Preferably the opening 19 or the opening 20, or the openings 25, as well as the openings 27 in the washers 23 are oval in contour, but it is to be understood that said openings can be of any suitable contour with the openings in the washers 18 and 23 conforming in contour to the opening or openings formed in the main pipe line.

The diameter of the branch or take-off pipe may be of the same diameter as that of the diameter of the pipe line, or of any other diameter, but the diameter of the branch or take-off pipe is regulated by the size of the take-off openings 19 or 25 which establish communication between the main pipe line and the branch or take-off pipe.

When the form as illustrated in Figure 5 is employed, the discharge or take-off is had in opposite directions from one location.

Although the branch or take-off pipe is shown connected with the saddle by a screw joint, yet it is to be understood that the branch or take-off pipe can be connected to the saddle in any desirable manner other than that shown.

The packing washers provide for a tight fit between the branch or take-off pipe and the main pipe line and further prevents leakage during the discharge or take-off operation from the main pipe line to the branch or take-off pipe.

Although the preferred embodiment of the invention is as described and illustrated, yet it is to be understood that changes in the details of construction can be had which will fall within the light of the invention as claimed, and although the saddles are illustrated as positioned against the top and bottom of the main line, it is obvious that they can be secured to the sides thereof.

What I claim is:—

1. A take-off pipe connection comprising a pair of oppositely disposed saddles each having the medial part thereof shaped to surround a pipe line, means for detachably connecting the saddles to the pipe line, one of said saddles having its medial part provided with an opening of the same diameter throughout and through which extends a part of the pipe line, the said saddle further formed with an outwardly projecting sleeve registering with and having its inner diameter the same as the diameter of said opening, a take-off pipe extending into and connected to said sleeve and having its inner end edge bevelled inwardly in a curvilinear manner whereby the said edge at said end will be of greater width than the thickness of its body, and a flexible packing disk arranged within said opening and sleeve, permanently spaced from the walls thereof, mounted on the periphery of the pipe line and positioned against the bevelled inner end edge of said take-off pipe, said disk formed with an opening for establishing communication between the pipe line and take-off pipe and further having its outer edge spaced from the inner end of said opening in said saddle.

2. A take-off pipe connection comprising a saddle adapted to be connected to a pipe line and formed with an opening and an interiorly threaded sleeve registering with the latter, a flexible apertured packing element arranged in said opening and extending into said sleeve and adapted to be positioned on a part of the outer periphery of the pipe line and conform in contour throughout to the shape of said part, and a take-off pipe extending into and connected to said sleeve, said pipe having its inner end edge of a greater width than the thickness of the body of the pipe and curved, said edge upon the same are throughout and forming a curved bearing surface seating directly on the perimeter of said element.

3. A take-off pipe connection comprising a saddle adapted to be connected to a pipe line and formed with an opening and an interiorly threaded sleeve registering with the latter, a flexible apertured packing element arranged in said opening and extending into said sleeve and adapted to be positioned on a part of the outer periphery of the pipe line and conform in contour throughout to the shape of said part, and a take-off pipe extending into and connected to said sleeve, said pipe having its inner end edge of a greater width than the thickness of the body of the pipe and curved, said edge upon the same are throughout and forming a curved bearing surface seating directly on the perimeter of said element, the aperture in said packing element being of a width less than the inner diameter of the take-off pipe.

In testimony whereof, I affix my signature hereto.

WILLIAM B. GRAVES